United States Patent [19]
Sclaroff et al.

[11] Patent Number: 5,590,261
[45] Date of Patent: Dec. 31, 1996

[54] FINITE-ELEMENT METHOD FOR IMAGE ALIGNMENT AND MORPHING

[75] Inventors: Stanley E. Sclaroff, Boston; Alex Pentland, Cambridge, both of Mass.

[73] Assignee: Massachusetts Institute of Technology, Cambridge, Mass.

[21] Appl. No.: 59,449

[22] Filed: May 7, 1993

[51] Int. Cl.$^6$ .................................................. G06T 7/00
[52] U.S. Cl. ........................... 395/173; 382/284; 382/294
[58] Field of Search ........................... 395/152, 118–119, 395/124–125, 127, 152; 384/284, 294

[56] References Cited

FOREIGN PATENT DOCUMENTS 0440218  8/1991  European Pat. Off. .

OTHER PUBLICATIONS

Swain, "Morphing Madness", Amiga World, Oct. 1992, pp. 26–31.
Yao et al., "Feature Correspondence Using Probabilistic Data Association", *ICASSP '93: Acoustics Speech & Signal Processing Conf.*, 1993, pp. v–157 to v–160.
Lee et al., "Computing Correspondence Based on Regions and Invariants without Feature Extraction and Segmentation", *Computer Vision and Pattern Recognition*, 1993, pp. 655–656.
Zheng et al., "Automatic Feature Point Extraction and Tracking in Image Sequences for Unknown Camera Motion", *Computer Vision, 1993 4th Itn'l. Conf.* Apr. 1993, pp. 335–339.
Pentland, Alex and Sclaroff, Stan, "Closed–Form Solutions for Physically Based Shape Modeling and Recognition," *IEEE Transactions on Pattern Analysis and Machine Intelligence*, vol. 13, No. 7, Jul. 1991.
Pentland, Alex and Horowitz, Bradley, "Recovery of Non-rigid Motion and Structure," *IEEE Transactions on Pattern Analysis and Machine Intelligence*, vol. 13, No. 7, Jul. 1991.
Horn, Berthold K. P., "Closed–Form Solution of Absolute Orientation Using Unit Quaternions," *Optical Society of America*, 1987.
Shoemake, Ken, "Animating Rotation with Quaternion Curves," *San Francisco Jul. 22–26*, vol. 19, No. 3, 1985.
Shapiro, Larry S. and Brady, J. Michael, "Feature–Based Correspondence: An Eigenvector Approach," *Image and Vision Computing*, Jun. 1992.
Scott, Guy L. and Longuet–Higgins, H. Christopher, "An Algorithm for Associating the Features of Two Images," *Proc. R. Soc. Lond. B.* (1991) 244, 21–26.
Cootes, T. F., Cooper, D. H. Taylor, C. J., and Graham, J., "Trainable Method of Parametric Shape Description," *Butterworth–Heinemann Ltd.* 1992, vol. 10, No. 5, Jun. 1992.
Strickland, Robin N. and Mao, Zuhua, "Computing Correspondences in a Sequence of Non–Rigid Shapes", *Pattern Recognition*, vol. 25, No. 9, pp. 901–912, 1992.
Metaxas, Dimitri and Terzopoulos, Demetri, "Constrained Deformable Superquadrics and Nonrigid MOtion Tracking," *IEEE*, Jun. 3, 1991.
Joshi, Anupam and Lee, Chia–Hoang, "Using Elastic Nets for Correspondence in Range Data," *IEEE*, Mar. 28, 1993.

*Primary Examiner*—Mark K. Zimmerman
*Assistant Examiner*—Rudolph Buchel
*Attorney, Agent, or Firm*—Cesari and McKenna

[57] ABSTRACT

In a morphing system for creating intermediate images that, viewed serially, make an object in a source image appear to metamorphose into a different object in a target image, correspondences between feature points in the source and target images are determined by simulating the modes of motion of respective elastic sheets in which are embedded nodal points that correspond to respective feature points in the images. For each feature point, a generalized-feature vector is determined whose components represent the associated nodal point's participations in the various motion modes. Correspondences between feature points in the source and target images are determined in accordance with the closeness of the points' generalized feature vectors. Correspondences thus determined can additionally be used for alignment and object-recognition purposes.

18 Claims, 4 Drawing Sheets

FINITE-ELEMENT METHOD FOR IMAGE ALIGNMENT AND MORPHING

BACKGROUND OF THE INVENTION

The present invention is directed to the feature-correspondence problem encountered in object recognition, alignment, and morphing.

Alignment is the mapping of points from a first, "source" coordinate system, in which, say, a prototype object is described, into another, "target" coordinate system, in which an object somehow related is described. A camera in an manufacturing apparatus, for instance, may produce a two-dimensional image of a part waiting to be drilled. The image is expressed in terms of the target coordinate system, to which the drill-positioning system responds. The manufacturing apparatus, on the other hand, stores an internal model of a prototype of the part in terms of a source coordinate system, in which the locations to be drilled are also expressed. In order to drill the real-world part properly, the source coordinates of the model's holes must be mapped to target coordinates at which the drilling is actually to occur: the model and the real-world part must be aligned.

Alignment is also a first step in morphing, in which intermediate images are generated to make an object in a given first, source image metamorphose into a given second, target image. In each intermediate image, a point corresponding to a point in the source image is positioned by interpolating between a source-image point and a point in the target image with which the alignment process has associated the source-image point.

A related problem is object recognition, in which the task is to determine whether an object in an acquired image is of the type represented in an internal model.

All of these operations start with identification of feature points in the source and target images. These are typically the locations of edges, vertices, etc. that are of most visual interest. Generally inelegant but nonetheless workable methods that lend themselves to computer implementation have been used to identify feature points. But correspondences must then be assigned between feature points in the source image and those in the target image. To do this without human intervention is a problem.

The reason for this can readily be seen. The input to the correspondence-assignment process is feature data in the form of position coordinates, and there is almost never any direct relationship between the coordinates, in different images, of corresponding feature points. A number of attempts have accordingly been made to determine correspondences on the basis of feature-point descriptions that characterize different feature points in an image on the basis of their relationships to other feature points and the same image. A method described in Scott, "An Algorithm for Associating the Features of Two Patterns," *Proc. Royal Society of London*, pp. 21–26 (1991), employs eigenvectors of a "proximity description matrix," which describes Gaussian-weighted distances between point data. Shapiro et al., "Feature-Based Correspondence: an Eigenvector Approach," *Image and Vision Computing*, 10(5): 283–88, June 1992, describes a further development of this method.

This proximity method effectively assigns correspondences in some circumstances, but it is not information-preserving; i.e., the feature locations cannot be recovered from the description matrix. Moreover, the results of the computations that it employs are of limited value in morphing, alignment, or other processes of which correspondence determination is a prerequisite.

SUMMARY OF THE INVENTION

We have devised a correspondence-assignment technique that considerably reduces the degree to which humans must intervene in morphing, alignment, and object recognition. It employs elements of methods described in Pentland et al., "Recovery of Non-Rigid Motion and Structure" and Pentland et al., "Closed-Form Solutions for Physically-Based Shape Modeling and Recognition," both in *IEEE Trans. Pattern Analysis and Machine Intelligence* 13(7), July 1991. In those papers, objects in acquired images were given descriptions in terms of the displacements that would occur in the positions of nodal points on a prototype deformable elastic body if springs were attached between those nodal points and (fixed-position) feature points in the acquired image. Determination of the spring-attachment points, which could be thought of as a type of correspondence assignment, was performed in one of the conventional ways, but the displacements were found by solving for what were referred to as "modal" displacement. The effect was to decouple the system equations and thus greatly reduce the computational burden.

The present invention also employs modal displacements, but it uses them to find correspondences between feature points. Specifically, part of the correspondence-assignment process is mathematically equivalent to treating the feature points in each image as "nodes" similarly spaced in a respective elastic body (e.g., a "rubber sheet" if the images are two-dimensional) that has properties determined in a manner that will be described below. The behavior of each node in an image under various modes of the body's (often deformational) motion is computed, and the correspondence for a given node is determined on the basis of how similar its behavior is to that of its candidate mate in the other image.

Like the methods described in the Pentland et al. papers, ours employs the "finite-element method," which is commonly used for simulating elastic-body motion, to determine the body's various motion modes. Although our method is based on the behaviors of the discrete nodes, this behavior cannot be determined without considering the effects of the rest of the body, which would, of course, undergo displacement as the nodal points are displaced during the motion to be observed. The finite-element method therefore begins by postulating an interpolation function, which gives the displacement of any (typically non-nodal) point as a function of that point's rest position (i.e., of its position in, say, the source image) and the displacements of all nodal points.

According to an optional aspect of the invention, the interpolation function is a sum of Gaussian functions centered at the various nodal rest positions in a manner that will be described below in more detail. Such functions are particularly desirable because they readily adapt to the dimensionality of the data: a two-dimensional Gaussian function is readily factored into one-dimensional Gaussian functions. Moreover, they lend themselves to development of closed-form solutions to certain computations that the method requires.

With the relationship between nodal and non-nodal positions thus assumed, we further assume a (possibly uniform) mass distribution throughout the body and a stress-strain relationship in its "material" so that it will vibrate as conversions occur between inertial and elastic energy. On the basis of these assumptions, we can write the equations of motion of the system of nodal points and obtain from them eigenvectors that represent respective characteristic vibrational modes of the system.

Each component of an eigenvector is associated with a different node and represents the relative participation of that node in the motion of the vibrational mode that the eigenvector represents. The set of participation levels for a given node, ordered in accordance with their respective eigenvectors' eigenvalues and thus in accordance with their modal vibration frequencies, can be thought of collectively as a generalized feature vector, which associates that node with a point in a feature space. Correspondences between nodes can then be assigned in accordance with how close a node from one image is in the generalized feature space to its candidate mate from the other image.

Unlike the proximity methods for determining correspondence mentioned above, the method of the present invention is information-preserving, and the underlying finite-element-method model can be used to interpolate intermediate deformations in the morphing process and to perform other functions of which correspondence determination is a prerequisite, such as obtaining canonical descriptions for object recognition. While the method of the present invention, as applied to object recognition, has some similarities to other object-description approaches, such as the chord-length method described in Cootes, "Trainable Method of Parametric Shape Description," *Image and Vision Computing* 10(5): 289–94, June 1992, the chord-length method requires that full correspondences be given as an input, while our method determines those correspondences.

Furthermore, by obtaining the eigenvectors through simulation of a continuous body in which the sampled feature points are embedded, the present invention is not nearly as sensitive to the manner in which the images are sampled. For instance, if there are very different sampling densities in two images, then the matrices that result from the proximity and chord-length descriptions will differ considerably even if the object's pose and shape are identical, while the matrices produced by our method, which is based on simulation of the motion of the virtual material in which the feature points are embedded, would not differ to nearly the same extent. Moreover, our method provides the possibility of emphasizing or de-emphasizing certain features, as a result of external information that may be available, by varying the assumed material properties of the virtual material in accordance with position in the elastic body.

BRIEF DESCRIPTION OF THE DRAWINGS

These and further features and advantages of the present invention are described below in connection with the accompanying drawings, in which.

DETAILED DESCRIPTION OF ILLUSTRATIVE EMBODIMENTS

Figure 1:
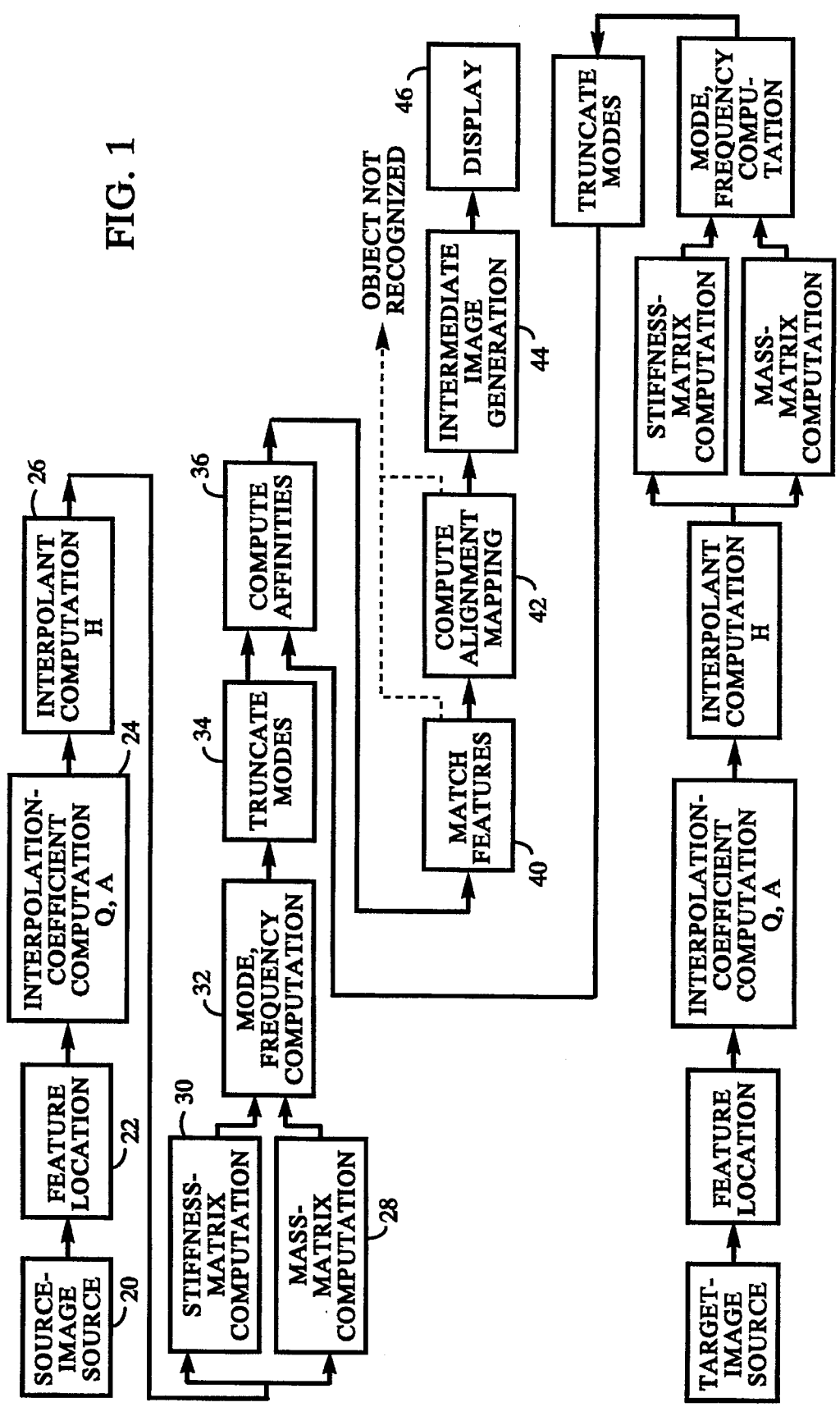
FIG. 1 is a block diagram depicting a morphing method that employs the teachings of the present invention.

FIG. 1 depicts in block-diagram form a morphing system that embodies the present invention. In practice, a common general-purpose computer, appropriately programmed, ordinarily performs most of the system's functions, although this arrangement is not necessary in principle. In most of our studies, for instance, we have employed a Sun SPARC2 workstation to implement parts of the system, using disk-stored programming, and have generated output images by laser printer and cathode-ray tube. We have also transferred the software to other platforms for such studies. But those skilled in the art will recognize that the present invention can be embodied in a wide range of digital computers with programming stored in any type of storage medium. Indeed, if an application justifies it, dedicated circuitry not requiring separate programming can be used to implement the teachings of the present invention.

Although most of the system's functions will ordinarily be performed by common circuitry, we follow custom by using separate blocks to represent separate functions. Operation begins with an image from any appropriate image source 20. In a step represented by block 22, the locations of important point features in the image are extracted from that image. Such features, which are typically corners, points on edges, etc., are extracted in any convenient way. In principle, they could even be extracted by direct human selection. The result is a set of position vectors, each of which gives the position of a feature point in the source image.

Initially, we will discuss the processing of the data from only the source image, although an identical operation is also performed on the target image. For the sake of simplicity, the discussion will begin with a way in which the method can be applied to images that are in rough alignment, in which the centroids of the objects feature points are close, their rotational orientations differ, if at all, by only a little, and they are displayed at similar scales. These assumptions will then be relaxed to describe ways in which the invention can be applied to the more general problem. For purposes of explanation, moreover, we will assume that the image is a two-dimensional image, but the applicability of the method to images of any dimensionality will be apparent.

As was stated above, the present invention is based on characterizing each of the extracted feature points, which we will hereafter refer to as "nodes," in terms of their participations in the motion of various modes of (often deformational) motion of an elastic sheet in which they are assumed to be embedded. To identify these modes of motion, we need to consider the equation of motion of this system of nodes. The equation of motion describes the variations in the displacements of the various nodes from their rest positions as the elastic sheet vibrates or otherwise moves.

The equation of motion is thus an equation in U, where, if there are n nodes, U is a 2n-component vector (in the two-dimensional case assumed in the example) representing the varying displacements from their rest positions that the nodes undergo during the elastic sheet's vibration. (Conveniently, although not necessarily, the position vector that the feature-extraction process yields for a node in the source image can be considered its rest position.) To determine what this motion will be, it is necessary to consider the elastic and inertial forces imposed by the rubber sheet as well as any external, "input" forces used to force any deformation. These input forces are assumed to be restricted to lumped forces applied only at the nodes. The resulting equation is $$M\ddot{U}+KU=F, \tag{1}$$

where M is a 2n×2n matrix, to be described below, that represents inertial effects, K is a 2n×2n matrix, which we will also describe below, that represents elastic effects, and F is a 2n-component vector representing two components (x and y) of force at each node. Note that the sheet is assumed to be perfectly resilient: the equation includes no damping factor. Such an assumption is convenient but not necessary.

Each row of M is associated with one or the other of the two inertial-force components at a respective node, and a row's constituent components represent the contributions to that inertial-force component that result from respective acceleration components at the various nodes. In other words, a row of M is the transpose of a vector whose scalar product with $\ddot{U}$ is one or the other of the two components of inertial force experienced by the node with which that row of M is associated.

In a similar manner, K represents the contributions of the displacements at all nodes to the elastic restorative force experienced by each node.

Determining M and K requires an assumption concerning the displacements that occur at non-nodal points in the elastic sheet when the nodal points are displaced. That is, we need to find a displacement interpolation matrix H(x) such that:

$$u(x)=H(x)U, \tag{2}$$

where u(x)=(u,v) is the displacement of a (not in general nodal) point whose rest position is x=(x, y). By assuming that the sheet material is isotropic, we can write equation (2) as:

$$u(x) = \begin{bmatrix} h_1\,h_2\ldots h_n & 0\,0\,\ldots 0 \\ 0\,0\,\ldots 0 & h_1\,h_2\ldots h_n \end{bmatrix} \begin{bmatrix} u_1 \\ u_2 \\ \cdot \\ \cdot \\ u_n \\ v_1 \\ v_2 \\ \cdot \\ \cdot \\ v_n \end{bmatrix}, \tag{3}$$

where the $h_j$'s are functions of x.

To determine the form that the $h_j$'s should take, we first assume that deformation is a continuous function of position. This continuity requirement dictates that, if $x_j$ is the rest position of the jth node, u(x) should approach $(u_j,v_j)$ as x approaches $x_j$. This yields the requirement that $h_j(x)$ be unity at node j and 0 at all other nodes.

This is a criterion conventionally imposed on Galerkin interpolants when the finite-element method is employed. In accordance with one aspect of the invention, we meet these criteria by forming the $h_i$'s from Gaussian basis functions of the following type:

$$g_k(x)=e^{-\|x-x_k\|^2/2\sigma^2}$$

where σ, the Gaussian function's standard deviation, affects the size of the neighborhood in which a given node's displacement significantly affects those of non-nodal points, and the user will ordinarily optimize performance by varying σ in accordance with the scale of the image.

The component functions $h_i$ of the interpolation function H are respective sums of the n basis functions g:

$$h_i(x) = \sum_{k=1}^{n} a_{ik}g_k(x), \tag{4}$$

where the $\alpha_{ik}$'s are coefficients that make (4) satisfy the Galerkin criterion set forth above. The matrix A of $\alpha_{ik}$'s that satisfy this first criterion is given by $$A = \begin{bmatrix} g_1(x_1) & g_1(x_2) & \ldots & g_1(x_n) \\ g_2(x_1) & g_2(x_2) & \ldots & g_2(x_n) \\ \cdot & \cdot & & \cdot \\ \cdot & \cdot & & \cdot \\ \cdot & \cdot & & \cdot \\ g_n(x_1) & g_n(x_2) & \ldots & g_n(x_n) \end{bmatrix}^{-1}.$$

Block 24 represents computation of the G and A matrices, from which the interpolation function H can be determined by way of equation (4) in a step represented by block 26.

It may sometimes be desired to satisfy a second Galerkin criterion, which guarantees that, if all nodal points' displacements are the same, all other points' displacements are, too. A sufficient condition for this result is:

$$\sum_{i=1}^{n} h_i = 1.$$

This criterion, which is useful for smooth image interpolation, can be met by replacing the relationship of equation (4) with the following:

$$h_i(x) = \frac{\sum_{k=1}^{n} a_{ik}g_k(x)}{\sum_{j=1}^{n} \sum_{k=1}^{n} a_{jk}g_k(x)}.$$

Having now determined the displacement-interpolation matrix H(x), we are ready to determine the mass matrix M, which relates the inertial force at each node to the accelerations at all nodes. To find the value of the mass matrix M, we first note from equation (1) that each row of M relates a respective component of the lumped inertial force experienced at a respective nodal point to the nodal-point accelerations $\ddot{U}$. Now, if ρ is mass density, the inertial surface force (force/unit area) at x is $\rho\ddot{u}(x)=\rho H(x)\ddot{U}$. The proportion of this surface force allocated to the ith node is $h_i(x)$; i.e., the inertial-force contribution from the infinitesimal region dA to the force component $(f_i, f_{i+n})$ experienced at the ith node is $\rho h_i(x)H\ddot{U}dA$, so the vector $F_M$ giving the total inertial force allocated to the various nodes is $$F_M=\int_A \rho H^T H \ddot{U} dA,$$

which, by comparison with equation (1), indicates that the mass matrix is given by:

$$M=\int_A \rho H^T H dA.$$

If the Gaussian interpolation functions of equation (4) are employed, the integration region A can be an infinite plane, and that is the region that we ordinarily employ. In the simplest case, the mass density ρ can be assumed to be uniform, but it is one of the advantages of the present invention that it lends itself to emphasizing certain features, if that is desired, by making the mass density depend on position in the elastic sheet.

From the zeros in the It matrix shown in equation (3), we see that:

$$M = \begin{bmatrix} M_{aa} & 0 \\ 0 & M_{bb} \end{bmatrix},$$

where the n×n submatrices $M_{aa}$ and $M_{bb}$ are positive semi-definite symmetric matrices and $M_{aa}=M_{bb}$. It can be shown that:

$$m_{aaij} = \rho\pi\sigma^2 \sum_{kl} a_{ik}a_{jl} \sqrt{g_k(x_l)},$$

where $$g_k(x_l) = e^{-\|x_k - x_l\|^2/2\sigma^2}.$$

Block 28 represents this mass-matrix calculation.

We next evaluate the stress matrix K of equation (1), which relates the net restoration, or elastic, force at each node to the displacements at all of them. To evaluate it requires considering the behavior of the stresses throughout the elastic sheet, which in turn involves determining the strains. The x and y components of tensile (or compressive) strain at an arbitrary point x=(x,y) are ∂u/∂x and ∂v/∂y, respectively, while the shear strains are respectively ∂u/∂y and ∂v/∂x. To determine stresses from these, we assume a Young's modulus E and Poisson's ratio α for the hypothetical sheet material. Although stress in the one-dimensional case is determined simply by multiplying the strain by Young's modulus, the two-dimensional case requires one to take into account shear stresses and the tendency of a stretched body to contract in the direction normal to the tensile strain to a degree given by Poisson's ratio. The resultant x-direction tensile stress $\sigma_{xx}$ is $\beta(\partial u/\partial x + \alpha \partial u/\partial y)$, where $\beta = E/(1-\alpha^2)$. Similarly, the y-direction tensile stress $\sigma_{yy}$ is $\beta(\partial u/\partial y + \alpha \partial u/\partial x)$, while the shear stress $\sigma_{xy} = \beta\gamma(\partial u/\partial x + \partial u/\partial y)$, where $\gamma = (1-\alpha)/2$. By introducing a strain matrix B:

$$B(x) = \begin{bmatrix} \frac{\partial h_1}{\partial x} & \frac{\partial h_2}{\partial x} & \cdots & \frac{\partial h_n}{\partial x} & 0 & 0 & \cdots & 0 \\ 0 & 0 & \cdots & 0 & \frac{\partial h_1}{\partial y} & \frac{\partial h_2}{\partial y} & \cdots & \frac{\partial h_n}{\partial y} \\ \frac{\partial h_1}{\partial y} & \frac{\partial h_2}{\partial y} & \cdots & \frac{\partial h_n}{\partial y} & \frac{\partial h_1}{\partial x} & \frac{\partial h_2}{\partial x} & \cdots & \frac{\partial h_n}{\partial x} \end{bmatrix}$$

and employing the interpolation matrix H to express the non-nodal displacements in terms of the nodal ones, we can write the stresses at an arbitrary point x in matrix form:

$$\begin{bmatrix} \sigma_{xx} \\ \sigma_{yy} \\ \sigma_{xy} \end{bmatrix} = CB^T U,$$

where $$C = \beta \begin{bmatrix} 1 & \alpha & 0 \\ \alpha & 1 & 0 \\ 0 & 0 & \gamma \end{bmatrix},$$

To determine the contributions of these stresses to the net restorative force at the ith node, we consider the work performed in changing the strain at an arbitrary point x when an infinitesimal displacement $du_i$ occurs at the ith node. The work per unit area is the product of the stress and the increased strain at x. The increased tensile strain is simply $(\partial h_i/\partial x)du_i$, while the increased shear strain is $(\partial h_i/\partial y)du_i$, so an incremental displacement $du_i$ performs $(\sigma_{xx}\partial h_i/\partial x + \sigma_{xy}\partial h_i/\partial y)du_i$ per unit area of work at any arbitrary point x. This means that the contribution from a section dA at x to the net x-direction force component $f_i$ at the ith node is $(\sigma_{xx}\partial h_i/\partial x + \sigma_{xy}\partial h_i/\partial y)dA$. Similarly, the contribution to the y component $f_{i+n}$ at the ith node is $(\sigma_{yy}\partial h_i/\partial y + \sigma_{xy}\partial h_i/\partial x)dA$. By integrating over the entire sheet, therefore, we obtain $$F_K = \int_A B^T CBU dA,$$

where the components of $F_K$ are the net restorative forces at the nodal points. Comparing this with equation (1) yields the following expression for the stress-interpolation matrix K:

$$K = \int_A B^T CB dA = \begin{bmatrix} K_{aa} & K_{ab} \\ K_{ba} & K_{bb} \end{bmatrix}.$$

It can be shown that the elements of $K_{aa}$ have the form $$k_{aaij} = \beta\pi \sum_{kl} a_{ik}a_{jl} \left[ \frac{1+\gamma}{2} - \frac{1}{4\sigma^2}((x_k - x_l)^2 + \gamma(y_k - y_l)^2) \right] \sqrt{g_k(x_l)},$$

the elements of $K_{bb}$ have the form:

$$k_{bbij} = \beta\pi \sum_{kl} a_{ik}a_{jl} \left[ \frac{1+\gamma}{2} - \frac{1}{4\sigma^2}((y_k - y_l)^2 + \gamma(x_k - x_l)^2) \right] \sqrt{g_k(x_l)},$$

and the elements of $K_{ab}$ and $K_{ba}$ have the form:

$$k_{abij} = \beta(\alpha + \gamma) \frac{\pi}{4\sigma^2} \sum_{kl} a_{ik}a_{jl} [(x_k - x_l)(y_l - y_k)] \sqrt{g_k(x_l)}.$$

Block 30 represents this stiffness-matrix computation.

We have thus found the values of the mass matrix M and the stiffness matrix K in equation (1), which can therefore be solved for U(t) if an input F is given. Initially, however, we are interested in finding the system's vibrational "modes," which can be determined without assigning a specific value to F. The modes are the eigenvectors φ of the matrix $KM^{-1}$, i.e., the solutions to the equation $$K\phi = \omega^2 M\phi,$$

which are readily computed along with their corresponding eigenvalues $\omega^2$.

The mathematical significance of these solutions φ is that they enable us to rewrite the equation of motion (1) as a decoupled system of equations. To demonstrate this, we first arbitrarily choose the magnitudes of the φs so that they are M-orthonormalized, i.e., $$\phi_i^T M \phi_j = \begin{cases} 1, & i=j \\ 0, & i \neq j \end{cases}.$$

This enables us to write:

$$\Phi^T K \Phi = \Omega^2 \qquad (5)$$

and $$\Phi^T M \Phi = I, \qquad (6)$$

where I is the identity matrix, $$\Phi = [\phi_1, \phi_2, \ldots, \phi_{2n}],$$

$$\Omega^2 = \begin{bmatrix} \omega_1^2 & & & \\ & \omega_2^2 & & \\ & & \ddots & \\ & & & \omega_{2n}^2 \end{bmatrix},$$

and, for reasons of convenience that will become apparent below, $$\omega_i \leq \omega_{i+1}.$$

By employing equations (5) and (6), we can rewrite the equation of motion (1) in terms of modal displacements $\tilde{U}$ defined such that $U = \Phi \tilde{U}$; i.e., $\tilde{U} = \Phi^T M U$. We transform the equation of motion (1) thus:

$$\Phi^T[M\ddot{U} + KU] = \Phi^T F$$

$$\Phi^T M \ddot{U} + \Phi^T K U = \Phi^T F$$

$$\Phi^T M \Phi \ddot{\tilde{U}} + \Phi^T K \Phi \tilde{U} = \Phi^T F$$

$$\ddot{\tilde{U}} + \Omega^2 \tilde{U} = \Phi^T F. \qquad (7)$$

This is a system of decoupled scalar differential equations; i.e., equation (7) can be solved for any component of the modal displacement vector $\tilde{U}$ without reference to any of its other components.

Block 32 represents computation of the eigenvectors $\phi$. This includes determining eigenvector direction in accordance with the definition of eigenvector and assigning eigenvector magnitudes by the M-orthonormalization constraint mentioned above. But this constraint still leaves two possible values for each eigenvector, one of which is the negative of the other. We accordingly also choose between the two in a manner that will be described below. The eigenvectors are often referred to in related contexts as "mode shapes," because the unforced (F=0) response of the imaginary resilient sheet to any initial deformation can be decomposed into a weighted sum of responses $A_i \phi_i \sin(\omega_i t + \theta_i)$, where $A_i$ and $\theta_i$ are constants.

As was stated above, we want to characterize each nodal point by its set of relative participations in the several modes. To this end, we write the modal matrix $\Phi$ in terms of generalized feature vectors $v_i$:

$$\Phi = \begin{bmatrix} v_1^T \\ v_2^T \\ \vdots \\ v_{2n}^T \end{bmatrix},$$

each of which defines the set of such relative participations for a respective feature and can be thought of as that feature's location in a generalized feature space. Associations between features in the source image and features in the target image are then determined by how close they are in the generalized feature space.

Of course, the eigenvectors and eigenvalues computed for the source image will not in general be the same as those of the target image; indeed, the number of feature points, and thus of modes, in one image is not in general the same in one image as it is in the other. Something must therefore be done to make the two generalized-feature-vector spaces correspond. One way of making the dimensionalities of the two generalized-feature-vector spaces the same is to truncate the generalized feature vectors at a given dimensionality. We have done this in some experiments by retaining only the lowest-frequency 25% of the components, because the higher-frequency modes are the ones most sensitive to noise. (For reasons that will be explained below, we additionally discard the lowest-frequency modes in certain applications.) Block 34 represents this truncation. Correspondences between dimensions in the two generalized-feature-vector spaces are then assigned in accordance with the positions in which they fall when they are ordered by the magnitudes of their respective eigenvalues and thus of their respective modal frequencies. This was our purpose in ordering feature-vector components by eigenvalue.

Discarding the highest-eigenvalue modes (as well as, in situations described below, the lowest-eigenvalue modes) results in truncated generalized-feature vectors $v_k'$, each of which defines the set of relative participations in the various modes for a respective feature and can be thought of as representing that feature's location in a truncated generalized-feature space. As FIG. 1 indicates, the operations described so far as being performed for one image are actually performed for both.

All applications of the present method are based on determining how close the generalized feature vector determined for a feature (i.e., nodal) point in one image is to that determined for a feature point in the other image. Clearly, many measures of "closeness" can be used in this connection, and many criteria can be applied to such measures to determine correspondences. Those skilled in the art will find most to be more or less desirable for various applications. When the present invention is used for object recognition, for instance, an object in an acquired image may be considered not to be of the same type as that in a prototype image unless, say, the generalized feature vectors determined for a predetermined number or percentage of feature points in the acquired image are within a predetermined threshold distance from the generalized feature vectors determined for respective feature points in the prototype image. If this criterion is not met, the system will generate an indication at this point that the object in the acquired image is not of the tested-for type, as FIG. 1 indicates for purposes of explanation even though it is intended to represent a system for morphing, not object recognition.

For alignment and morphing purposes, anchor points, on which development of the mapping function is based, are the feature points in a given image whose generalized feature vectors are least distant from those of corresponding features in the other. Correspondences between points in the two images can be determined, for instance, by beginning with computation of an "affinity matrix" Z. If the ith and jth feature points in the source and target images, respectively, are respectively represented by truncated generalized feature vectors $v_{i,s}'$ and $v_{j,T}'$, then each element $z_{ij}$ of Z is given by:

$$z_{ij} = \|v_{i,s}' - v_{j,T}'\|^2.$$

Block 36 represents this operation. For a perfect match between source point i and target point j, $z_{ij}$ will be 0, while worse matches result in larger values of $z_{ij}$.

In this connection, we briefly return to the sign-assignment aspect of the eigenvector-computation operation 32. As was stated above, the eigenvector-definition and M-orthonormalization constraints leave two possible values for each eigenvector. Since eigenvectors are computed separately for the two images, this could result in a great difference between the generalized feature vectors computed for corresponding feature points even in identical images if the eigenvector signs were assigned at random. We accordingly choose signs in such a manner as to minimize differences between the generalized feature vectors for corresponding features.

We do this in a manner similar to that described in a 1991 technical report by L. Shapiro of the Oxford University Robotic Research Group entitled "Towards a Vision-Based Motion Framework." As that report states, the method is based on the assumption that objects in the two images are expected to correlate, and it arbitrarily considers the signs of the eigenvectors from one image to be correct. Each of the other image's computed eigenvectors is then tested to determine whether it or the opposite-signed eigenvalue minimizes the distances between feature vectors.

Specifically, one eigenvector at a time is considered in an iterative procedure. For each eigenvector in succession, an operation is performed that is equivalent to finding distances between "zero-stuffed" generalized-feature vectors, which are the same as the generalized-feature vectors determined from the originally computed eigenvector except that all components that correspond to eigenvectors not yet considered are set to zero. This results in a test affinity matrix $Z_{q,pos}$ in which the elements are given by $$z_{q,pos,ij} = \|\hat{v}_{q,i,S} - \hat{v}_{q,j,T}\|^2$$

where $\hat{v}_{q,i,S}$ is the same as the ith feature vector from the source image except that all components corresponding to eigenvectors after the qth one are set to zero and $\hat{v}_{q,j,T}$ is the jth similarly stuffed feature vector from the target image. Each column of this matrix lists the squared distances in generalized feature space between one feature in the target image and all of the features in the source image, so the lowest value in each column is the square of the distance from the corresponding target feature to the closest source feature. All such lowest values are added together. The procedure is then repeated for the same eigenvector except that the signs of all of the qth target-image eigenvectors' components are reversed to make the stuffed target-image vector; i.e., the qth component of $\hat{v}_{q,j,T}$ is reversed. If the sum of the lowest values is less this time, the qth target eigenvector's signs assume the reversed values. Otherwise, they retain their original values. This procedure continues until all eigenvectors, or as many as will be used in the truncated-generalized-feature space, have been considered.

We now return to the correspondence determination. For a source point i to be considered to correspond to a target point j, the following conditions may be imposed: $z_{ij}$ must (1) be less than a predetermined threshold and (2) be a minimum both in the ith row and in the jth column. In most cases, this does not yield a match for every nodal point, but it ordinarily produces a number of correspondence pairs. We consider these to be pairs of "anchor" points.

Having thus identified anchor pairs, we will use them to determine the function for mapping other points from the source image to the target image. There are a number of existing ways of determining a mapping function from feature-point correspondences, any of which can be employed in accordance with the broader teachings of the present invention. In the examples that follow, however, we will emphasize approaches that the present invention's correspondence-determination method facilitates.

We will start with a relatively simple example. This way works best when there is little difference in orientation between the images. In this approach, the mapping is obtained by simply applying the displacement-interpolation matrix H to a feature-point displacement vector U whose value is such as to displace the anchor points in the source image to the positions of the corresponding points in the target image. But the anchor-point determination, as was stated above, ordinarily determines correspondences for less than all of the feature points. We therefore do not yet have a complete set of values for the feature-point displacement vector U.

To assign displacements of the other feature points, we can use various approaches. A simple one is the equilibrium approach, in which we observe the positions that the other feature points—i.e., the unmatched nodes—assume when we simulate applying to the matched, anchor nodes forces that at equilibrium displace them to the positions of their mates when no external forces are applied to the unmatched nodes. In the equilibrium equation $$KU = F,$$

in other words, we set to zero the components of F associated with unmatched nodal points, set the components of U associated with matched nodal points to the values that move them to their mates, and solve the resulting set of 2n equations in 2n variables for the components of U that correspond to unmatched nodal points. (In the typical, isotropic case, solving n equations in n variables gives the values for all 2n variables.) This operation, represented by block 40, yields a value $U_{equil}$ that translates the non-matched nodes in the source image to locations that are not in general those of nodal points in the target image but are consistent with a deformation of the elastic sheet that causes the displacements found for the anchor points.

By substituting this value of the nodal displacements $U_{equil}$ into equation (2), we can calculate the deformation by which any point (nodal or non-nodal) from the source image is mapped to a point in the target image. We have thus aligned the two images. That is, we have found a mapping function:

$$x_T = x_s + H(x_s)U_{equil}, \qquad (8)$$

where $x_T$ is the location to which a point at $x_s$ in the source image is mapped.

Another approach is to find the unknown elements of U by assuming U is made up of only 2p more-zero modal components if correspondences have been found for only p of the n nodes. This approach solves for the modal displacements directly, by using the equation:

$$U = \Phi \tilde{U}$$

If we have found correspondences for p of the n nodes, then we reduce the degrees of freedom by discarding 2(n-p) of the high-frequency eigenvectors (columns $\phi_i$). This yields a mode-truncated transformation matrix $\bar{\Phi}$. We then discard the rows of $\bar{\Phi}$ which are associated with unmatched nodes. The resulting system of equations has 2p equations and 2p unknowns, so we can solve for the modal displacements directly. This again enables us to obtain a solution in closed form.

By imposing an additional constraint, it is possible to find a solution for the displacements in which we allow the loads at unmatched nodes to be nonzero. We find loads at the unmatched nodes that minimize the strain energy $E_f$:

$$E_f = \tfrac{1}{2} U^T K U = \tfrac{1}{2} U^T F.$$

The unknown nodal displacements and loads can be solved for via gradient descent. The resulting nodal displacements can be transformed into modal displacements via the modal transform. Alternatively, the minimum strain energy can be measured directly in terms of modal displacements, i.e.:

$$E_f = \tfrac{1}{2} U^T K U = (\Phi \tilde{U})^T K (\Phi \tilde{U}),$$

$$E_f = \tfrac{1}{2} \tilde{U}^T \Phi^T K \Phi \tilde{U}$$

$$E_f = \tfrac{1}{2} \tilde{U}^T \Omega^2 \tilde{U}.$$

This strain energy equation enforces a penalty which is proportional to the squared vibration frequency associated with each mode. Since rigid body modes ideally introduce no strain, it is logical that their vibrational frequency $\omega_i = 0$.

The mappings described so far map all anchor points to their mates. This is not the most desirable mapping for all applications. But it is true for most applications that the mapping function desired will be one that minimizes or maximizes some function of the relationships between the positions of an anchor point's mate and the position to which the mapping function maps that anchor point.

In some alignment applications in which noise is expected in the data, for example, it can be shown that highest probability of proper alignment is achieved by "moving" one image's anchor points not exactly to the others' but rather to locations whose determination is mathematically equivalent to holding the target nodal points fixed and finding the source-image rest positions that result from placing between the points in anchor pairs virtual springs whose spring constants depend on the expected noise. In such cases, the equilibrium equation is solved as before, except that all displacement components are unknowns.

Specifically, let us renumber the target-image feature points so that, if the ith source point is an anchor point and $x_{S,i}$ is its location, $x_{T,i}$ is the location of the target-image feature point that corresponds to it. Then, if the ith feature point is an anchor point, $$\begin{bmatrix} f_i \\ f_{i+n} \end{bmatrix} = k_i(x_{T,i} - x_{S,i}),$$

where the $k_i$'s are spring constants assigned in accordance with the expected noise level and, if the ith feature point is not an anchor point, $$\begin{bmatrix} f_i \\ f_{i+n} \end{bmatrix} = \begin{bmatrix} 0 \\ 0 \end{bmatrix}.$$

This does not add to the total number of unknowns, because the anchor-point forces, although still unknown, are constrained to be proportional to displacement.

Since n can be large, it may be preferable computationally to solve for displacement by way of decoupled equations. For this purpose, of course, we can use the modal displacements $\tilde{U}$. That is, we can instead solve the decoupled equation:

$$\Omega^2 \tilde{U} = \Phi^T F,$$

although using the spring version of F recouples the equation if the spring constants are not equal. Moreover, little inaccuracy is introduced—and some noise rejection is added in certain applications—if the computational burden is reduced further by computing displacement contributions from only the lower-eigenvalue modes.

Another way of deriving an alignment from the anchor points, which we have sometimes employed, is to introduce a damping term into the system and then simulate the resulting motion. Specifically, we solve the dynamic equation:

$$\ddot{\tilde{U}}_t + \tilde{D} \dot{\tilde{U}}_t + \Omega^2 \tilde{U}_t = \Phi^T F_t$$

for its not displacement, where $\tilde{D}$ is a diagonal modal damping matrix assigned in a manner described below.

The resulting modal dynamic equilibrium equation can be written as a system of m independent equations of the form:

$$\ddot{\tilde{u}}_i(t) + \tilde{d}_i \dot{\tilde{u}}(t) + \omega_i^2 \tilde{u}(t) = \tilde{f}_i(t),$$

where the $\tilde{f}_i(t)$'s are components of the transformed load vector $\tilde{F} = \Phi^T F$.

The modal displacements can then be solved by way of any iterative numerical integration procedure. In our implementation we use the Newmark method, an implicit iterative numerical integration technique. The system is integrated forward in time until the change in load energy goes below a threshold $\delta$, i.e.:

$$\|F_{t-\Delta t} - F_t\|^2 < \delta^2$$

This yields a rest displacement value $U_{equil}$ from which the mapping function follows immediately as before.

The modal damping matrix $\tilde{D}$ is diagonal because we assume Rayleigh damping. Under Rayleigh damping, the damping coefficients are linearly related to the mass and stiffness matrices:

$$D = \alpha M + \beta K.$$

Transforming into modal coordinates, we obtain a diagonal modal damping matrix:

$$\tilde{D} = \alpha \Phi^T M \Phi + \beta \Phi^T K \Phi = \alpha I + \beta \Omega^2.$$

As a result, damping for the ith mode is a function of that mode's squared frequency of vibration:

$$\tilde{d}_{ii} = \alpha + \beta \omega_i^2,$$

where $\alpha$ and $\beta$ are constants determined by the desired damping level. For instance, $\alpha = 0.1$, $\beta = 1/(2\omega_p^2)$, where $\omega_p^2$ is the highest eigenvalue being used, works well for the 2-D cases shown here.

While the process as described so far works well for a restricted, but nonetheless important, class of problems, a more-general approach requires some modifications. These modifications are required when the orientation, absolute position, and/or scale of one image differs significantly from that of the other. These situations necessitate two major adjustments. One is that the truncated feature vector, which defines the generalized feature space, is made for correspondence-determination purposes by discarding not only the highest-eigenvalue modes but also the lowest. This leaves only intermediate-eigenvalue modes to define the truncated feature space. The lowest-eigenvalue modes are discarded because there typically are several zero-eigenvalue modes, which represent translation and rotation, so position in truncated generalized feature space is undesirably sensitive to position and orientation if the zero-eigenvector modes are included. Some of the other low-eigenvalue modes should also be discarded if any significant differences in scale are expected, since scale differences tend to contribute (undesirably) to those modes. Elimination of these lowest-eigenvalue modes also reduces the adverse perspective effects that result from the use of different camera angles. In the two-dimensional case, therefore, we have typically eliminated the six lowest-eigenvalue modes from the truncated generalized-feature vectors.

The second major adjustment is that, if the approximate difference in scale is known, an appropriate adjustment should be made to the interpolation functions. For example, if an object in one image is expected to be twice as large as that in the other, the value of the standard deviation $\sigma$ used in the Gaussian interpolation basis functions for the first image should be twice that used in those for the second image.

With the exception of these two adjustments, the initial operation of determining anchor points is the same in the more-general approach as it is in the initially introduced approach. One could derive the mapping function from the anchor points in the same way, too, i.e., by solving for the remaining feature-point displacement and applying the interpolation function to the displacement vector thereby determined.

Particularly when the alignment is to be used for morphing, however, we prefer an approach that includes a step in which the anchor pairs are used as the basis for an intermediate, non-deformational alignment of the remaining points by a method described by Horn in "Closed-Form Solution of Absolute Orientation Using Unit Quaternions," *Journal of the Optical Society of America*, vol. 4, p. 629, April 1987. We prefer to employ this method, which we will outline below, because it provides explicit translation, rotation, and scaling values. It thus lends itself to morphing because it allows the rates of progressive translation, rotation, and scaling in successive intermediate images to be easily controlled separately from deformation.

Although we pointed out that the method is readily applicable to images having only one dimension or having three or more dimensions, we have assumed for purposes of the discussion so far that the image in the example is two-dimensional. In the following discussion of the Horn method for determining scaling and rigid-body transformations, however, we will assume that the image is three-dimensional, because certain aspects of the method are degenerate for two-dimensional images, so a three-dimensional exposition of these aspects will be clearer.

In accordance with this assumption, we begin with three-dimensional anchor points:

$$x_{S,i} = \begin{bmatrix} x_{S,i} \\ y_{S,i} \\ z_{S,i} \end{bmatrix}$$

in the source image to which correspondences have respectively been determined for points $x_{T,i}$ in the target image. We first find the centroids of the anchor points:

$$\bar{x}_S = \frac{1}{n} \sum_{i=1}^{n} x_{S,i}$$

$$\bar{x}_T = \frac{1}{n} \sum_{i=1}^{n} x_{T,i}$$

The translation value for a rigid-body transformation then is simply the difference between the centroids: $x_o = \bar{x}_T - \bar{x}_S$. (This is a departure from the Horn method.) To find the scale, we first subtract the centroids from the individual vectors. The results are primed vectors that express the locations of the matched nodal points in terms of their local coordinates:

$$x'_{S,i} = x_{S,i} - \bar{x}_S$$

$$x'_{T,i} = x_{T,i} - \bar{x}_T$$

We then find the scale s in accordance with $$s = \left( \frac{\sum_{i=1}^{n} \|x'_{T,i}\|^2}{\sum_{i=1}^{n} \|x'_{S,i}\|^2} \right)^{\frac{1}{2}}$$

The next step is to determine a rotation. In accordance with Horn's approach, we find this by way of "quaternions." A quaternion has been described variously as a four-component vector, a composite of a scalar and an ordinary vector, and a complex number having three different imaginary parts. We denote a quaternion by a symbol having a circle above it. A quaternion can be expressed in the following manner:

$$\mathring{q} = q_0 + iq_x + jq_y + kq_z,$$

where i, j, and k are separate imaginary parts defined thus:

$$i^2 = -1, \ j^2 = -1, \ k^2 = -1,$$

$$ij = k, \ jk = i, \ ki = j,$$

$$ji = -k, \ kj = -i, \ ik = -j.$$

Multiplication of quaternions is accordingly defined as follows:

$$\overset{\circ}{r}\overset{\circ}{q} = r_0q_0 - r_xq_x - r_yq_y - r_zq_z + i(r_0q_x + r_xq_0 + r_yq_z - r_zq_y) +$$
$$j(r_0q_y - r_xq_z + r_yq_0 + r_zq_x) + k(r_0q_z + r_xq_y - r_yq_x + r_zq_0)$$

A dot product is also defined:

$$\overset{\circ}{p} \cdot \overset{\circ}{q} = p_0q_0 + p_xq_x + p_yq_y + p_zq_z.$$

Finally, complex conjugation is defined for quaternions:

$$\overset{\circ}{q}* = q_0 - iq_x - jq_y - kq_z,$$

from which it follows that:

$$\overset{\circ}{q}\overset{\circ}{q}* = q_0^2 + q_x^2 + q_y^2 + q_z^2.$$

Now, if we consider an ordinary vector r to be represented by a purely imaginary quaternion:

$$r \Leftrightarrow 0 + ir_x + jr_y + kr_z,$$

then it can be shown that the vector r' that results from rotation through an angle θ about the axis defined by the unit vector ω=[ω_x, ω_y, ω_z]^T can be obtained by the following operation:

$$\overset{\circ}{r}' = \overset{\circ}{q}\overset{\circ}{r}\overset{\circ}{q}*,$$

where $$\overset{\circ}{q} = \cos\frac{\theta}{2} + (i\omega_x + j\omega_y + k\omega_z)\sin\frac{\theta}{2}.$$

An equivalent rotation is obtained in vector terms by multiplying the vector r' by a rotation matrix R derived from the rotation-representing (unit-magnitude) quaternion:

$$r' = Rr,$$

where $$R = \begin{bmatrix} q_0^2 + q_x^2 - q_y^2 - q_z^2 & 2(q_xq_y - q_0q_z) & 2(q_xq_z + q_0q_y) \\ 2(q_xq_y + q_0q_z) & q_0^2 - q_x^2 + q_y^2 - q_z^2 & 2(q_yq_z - q_0q_x) \\ 2(q_zq_x - q_0q_y) & 2(q_zq_y + q_0q_x) & q_0^2 - q_x^2 - q_y^2 + q_z^2 \end{bmatrix}$$

Now, our purpose in introducing the quaternion concept is to use it to express the desired rotation. The rotation desired is the one that, when combined with the above-determined scaling and translation, maps anchor points in the source image to locations in the target image that result in the least-squares error between those points and the points in the target image to which the anchor points correspond.

Horn demonstrated that, if a quaternion is thought of as a four-element vector $[q_0\ q_x\ q_y\ q_z]^T$, the quaternion corresponding to the desired, error-minimizing rotation is the unit eigenvector of the following matrix:

$$\begin{bmatrix} S_{xx} + S_{yy} + S_{zz} & S_{yz} - S_{zy} & S_{zx} - S_{xz} & S_{xy} - S_{yx} \\ S_{yz} - S_{zy} & S_{xx} - S_{yy} - S_{zz} & S_{xy} + S_{yx} & S_{zx} + S_{xz} \\ S_{zx} - S_{xz} & S_{xy} + S_{yx} & -S_{xx} + S_{yy} - S_{zz} & S_{yz} + S_{zy} \\ S_{xy} - S_{yx} & S_{zx} + S_{xz} & S_{yz} + S_{zy} & -S_{xx} - S_{yy} + S_{zz} \end{bmatrix}$$

corresponding to the most-positive eigenvalue, where $$S_{xx} = \sum_{i=1}^{n} x'_{S,i} x'_{T,i}, \quad S_{xy} = \sum_{i=1}^{n} x'_{S,i} y'_{T,i},$$

and so on.

From that quaternion, we can obtain the rotation matrix R as was described above. Putting the rotation, translation, and scaling together:

$$x_{rigid} = sRx'_s + \bar{x}_r + x_o$$

gives a non-deformational transformation that minimizes the mean-squared error E given by $$E = \sum_{i=1}^{n} \|x_{rigid,i} - x_{T,i}\|^2.$$

For simplicity in introducing the concept, we have described the way in which to find a rotation, scale, and translation that minimize the error on a mean-squared basis. In actuality, we prefer to minimize the error on a confidence-weighted basis, i.e., on a basis in which each point's contribution to the determination of these parameters depends on the distance in generalized-feature space between it and its mate. In terms of affinities $z_{ij}$, for instance, we can employ weights $\omega_i = 1/(1+z_{ij})$. When we use these weights, the centroids become weighted centroids:

$$\bar{x}_S = \frac{\sum_{i=1}^{n} w_i x_{S,i}}{\sum_{i=1}^{n} w_i} \quad \text{and} \quad \bar{x}_T = \frac{\sum_{i=1}^{n} w_i x_{T,i}}{\sum_{i=1}^{n} w_i}$$

Weights are used in determining the scale factor:

$$s = \left( \frac{\sum_{i=1}^{n} w_i \|x_{T,i}\|^2}{\sum_{i=1}^{n} w_i \|x_{S,i}\|} \right)^{\frac{1}{2}},$$

and the entries in the matrix of which the rotation-representing quaternion is the eigenvector are also modified:

$$s_{xx} = \sum_{i=1}^{n} w_i x'_{S,i} x'_{T,i}, \quad s_{xy} = \sum_{i=1}^{n} w_i x'_{S,i} y'_{T,i}, \text{ etc.}$$

Figure 3:
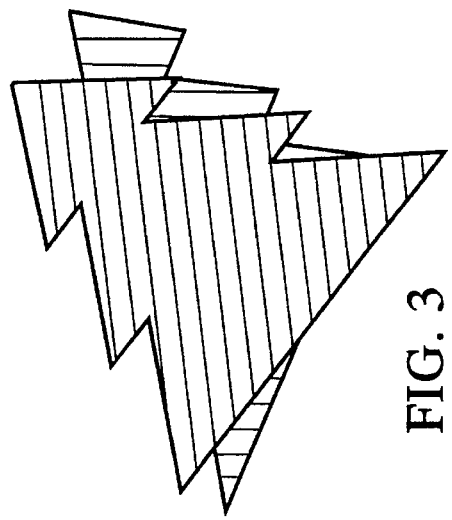
FIG. 3 depicts the result of a rigid-body transformation of one of the images.
Figure 2:
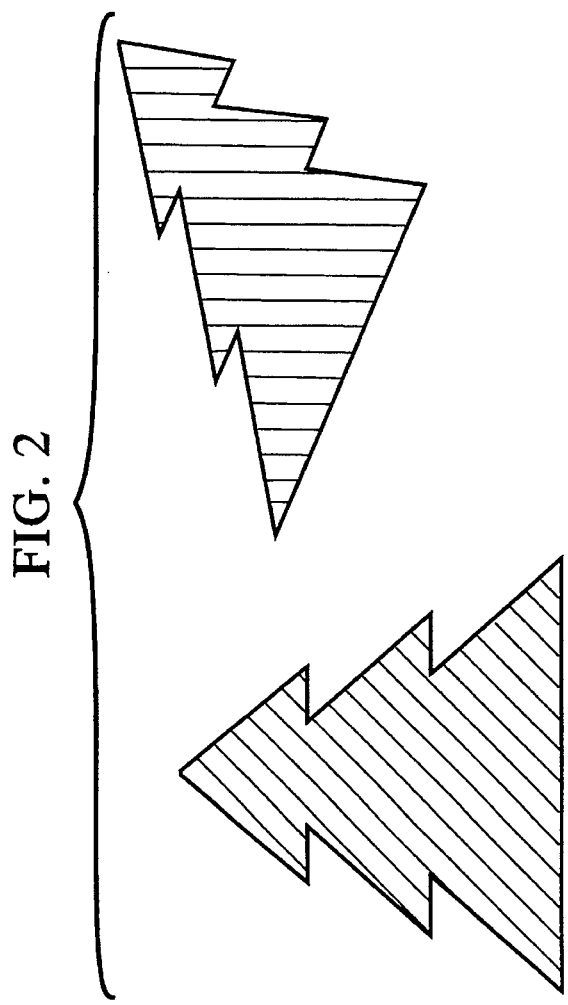
FIG. 2 depicts two images to be aligned.

The result is a non-deformational transformation that yields a rough alignment of the source and target images. FIG. 2 depicts a prototype tree and a target tree with which it is to be aligned. FIG. 3 shows the result of translation, rotation, and scaling.

In some applications, only a non-deformational transformation is desired. In one type of object-recognition system, for instance, acceptance may have two steps, the first being that of identifying anchor points by means of generalized feature vectors as was described above. If that step yields enough matches, the second step may be to determine whether the error that remains after only non-deformational transformation is within predetermined limits. To reflect this possibility, FIG. 1 includes an "Object Not Recognized" output of the alignment step 42 even though FIG. 1 depicts a morphing apparatus. Certain alignment applications, too, may be based on the assumption that a non-deformational mapping is more likely to be reliable than one based on deformation.

But other alignment applications, such as morphing, require a mapping function that can include deformation. To this end, we return to the finite-element method and, for purposes of explanation, to our assumption of two-dimensional images. Our approach is to find the anchor-point displacements that will move the source-image anchor points to intermediate locations from which the non-deformational transformations will move them to the target-image points to which they correspond. The displacements that result in these intermediate locations are readily found in accordance with $$\begin{bmatrix} u_i \\ u_{i+n} \end{bmatrix} = \frac{1}{s} R^T [x_{T,i} - x_0 - \bar{x}_S] + \bar{x}_T - x_{S,i},$$

where the ith feature point is assumed to be an anchor point. The resulting displacement values are employed as elements of a displacement vector $U_{equil}$ that specifies displacements for all of the source-image feature points, and one of the methods described above is used to find the other $U_{equil}$ elements.

With $U_{equil}$ determined, we now use it to find the mapping function. Simply applying the interpolation matrix H to the displacement vector $U_{equil}$ results in a mapping that so deforms the source image as to move the anchor points to intermediate points from which the non-deformational transformation is needed to move them to the target-image points to which they correspond. The proper mapping function is therefore computed to apply the scaling, rigid-body, and deformational transformations:

$$x_T = x_0 + sR[x_s - \bar{x}_s + HU_{equil}] + \bar{x}_s. \tag{9}$$

This alignment mapping is valid for the general case; reflection reveals that equation (8) is a special case of equation (9) in which the separately applied scaling is unity and the separately applied translation and rotation are both zero.

Figure 5:
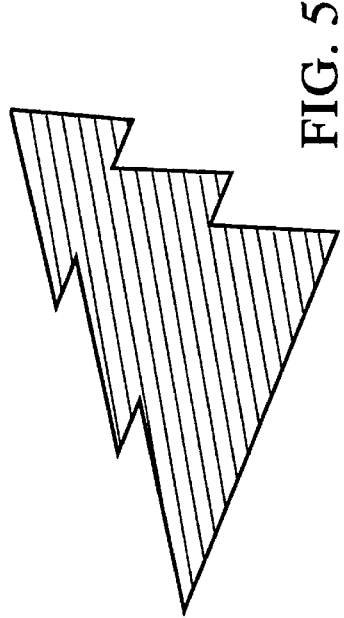
FIG. 5 depicts the result of a deformational transformation that employs all of the deformation modes.
Figure 4:
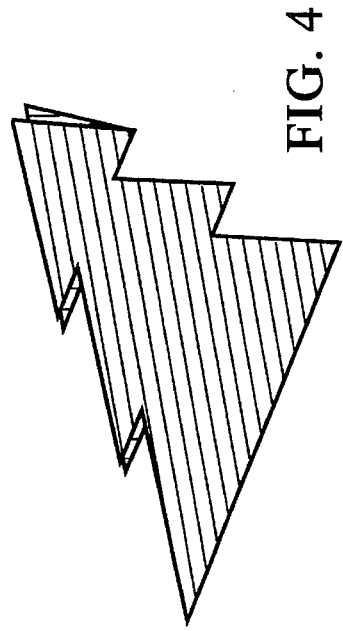
FIG. 4 depicts the result of a deformational transformation that employs only the lowest-eigenvalue deformation modes.

As was mentioned above, it may sometimes be preferable for the mapping function to employ displacement components that correspond to only some of the modes. In such a case, it is convenient to express the mapping function thus:

$$x_T = x_0 + sR[x_s - \bar{x}_s + H\Phi\beta\tilde{U}_{equil}] + \bar{x}_s,$$

where $$\tilde{U}_{equil} = \Phi^T M U_{equil}$$

and β is a diagonal vector in which elements that correspond to unused modes are zero and the other diagonal elements are unity. FIG. 4 shows the effect of using only the lowest-eigenvector modes, while FIG. 5 shows that of using all modes.

Having completed the alignment operation, we now turn our attention to the remaining morphing operations 44 (FIG. 1), which involve the generation of intermediate images that, shown in succession, make an object in the source image appear to metamorphose into an object in the target image. This is accomplished by image-to-image interpolation, of which any of a number of conventional types can be used to practice the present invention. Additionally, some of the following examples will demonstrate ways that take particular advantage of the finite-element method's results.

In one simple interpolation approach, a location in the kth intermediate image corresponding to each source-image location is identified by adding to the source-image location that source location's displacement vector multiplied by k/(L+1), where L is the number of intermediate images. The value (gray-scale or color) at that point in the intermediate image is a value determined from the source-point value by multiplying the difference between the source-point value and the target-point value by k/(L+1) and adding the result to the source value.

Although such an approach is simple, it is not flexible in the sense of lending itself to adjustments for the purpose of heightening the sense of physical reality. The latter purpose is served by methods that take advantage of the deformation modes previously described. Such methods can conveniently be described in terms of "flow fields." A flow field is a dense vector field that indicates the directions in which intermediate-image points corresponding to given source image points "move" from one image ("frame") to another. Just as the nodal displacements can be represented as the linear superposition of the decoupled modal displacements, the image flow field can, in arrangements in which the non-deformational transformations are not computed separately, be represented as the superposition of decoupled modal flow fields.

The component of nodal displacement between source and target image contributed by the ith mode is the product of the ith mode shape vector $\Phi_i$ and the ith component of $\tilde{U}_{equil}$. If we call the ith $\tilde{U}_{equil}$ component $\tilde{u}_i$, then the contribution $u_i$ of the ith mode to the source-to-target displacement of point x is given by $$u_i(x) = \tilde{u}_i H(x)\phi_i.$$

For intermediate frames, the contributions from the various modes can be modulated by animation functions $\beta_i(t)$, where t is a time-representing variable that assumes a value of zero at the source frame, increases with successive intermediate frames, and reaches unity at the target frame. These functions act as animation control knobs, choreographing the mixture of modal flow fields. This is illustrated in FIG. 6.

Figure 6:
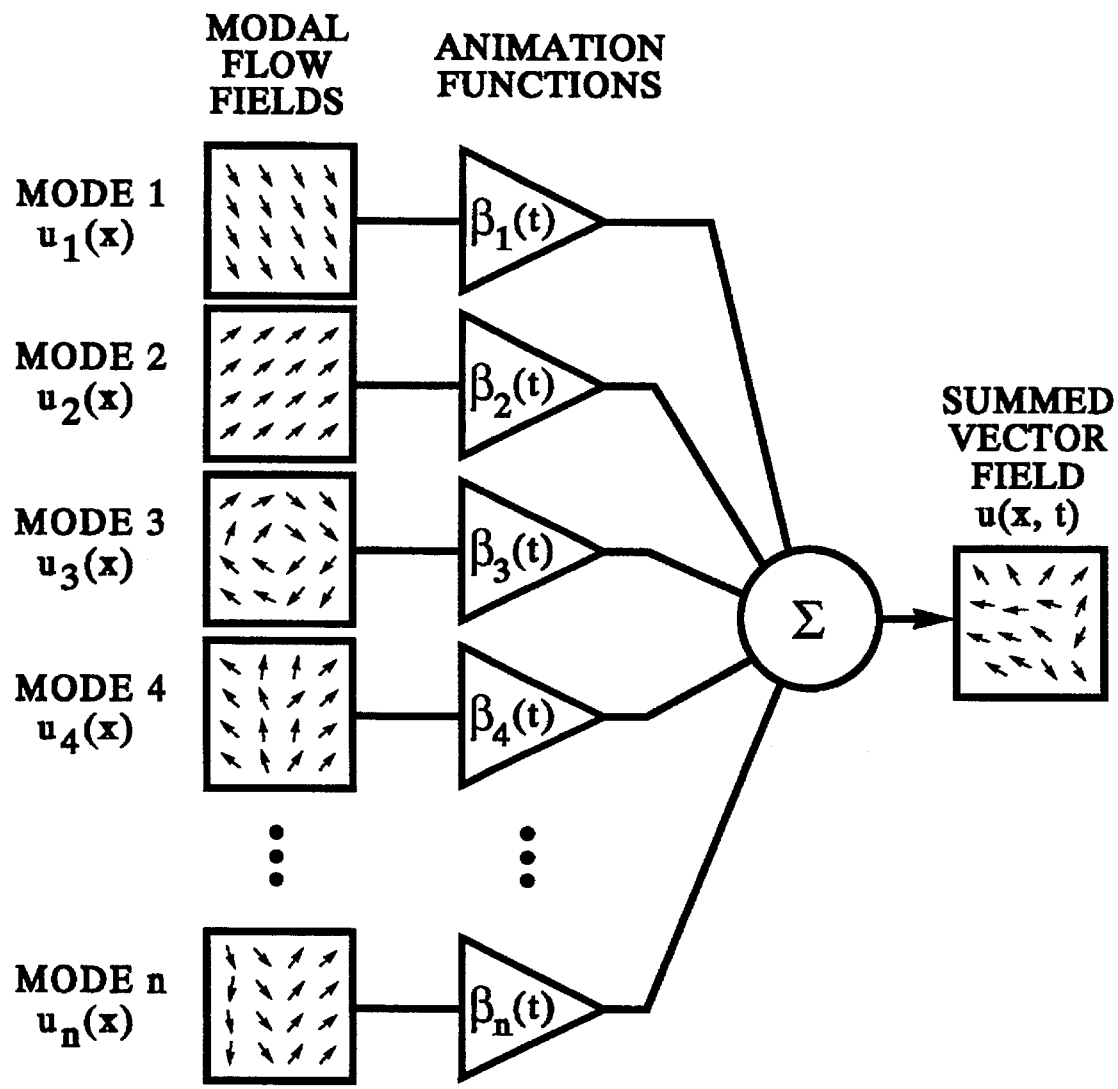
FIG. 6 is a block diagram that depicts an intermediate-image-generation process that does not apply scaling and rigid-body transformation separately from deformation.

For each of a plurality of values of t, 0<t<1, then, an intermediate displacement field u(x,t) is determined in accordance with the operation defined in FIG. 6 to generate an intermediate image on any appropriate display device 46 (FIG. 1), such as a cathode-ray tube or a paper or film printer. That is, for each of a plurality of points $x_s$ in the source, a location $x_s + u(x_s, t_k)$ in the kth intermediate image is assigned a color value $c_k$ interpolated between the color value $c_s(x_s)$ at that source-image point and the color value $c_T[x_s + u(x_s, 1)]$ at the corresponding point in the target image in accordance with $$c_k = \Gamma(t_k, c_T, c_s)$$

where $\Gamma$ is any appropriate color interpolation function such that $$\Gamma(0, c_T, c_s) = c_s$$

and $$\Gamma(1, c_T, c_s) = c_T.$$

By independently varying $\Gamma$ and the $\beta_i$'s, we can maximize the physical plausibility or other desired characteristics of the morphing.

Figure 7:
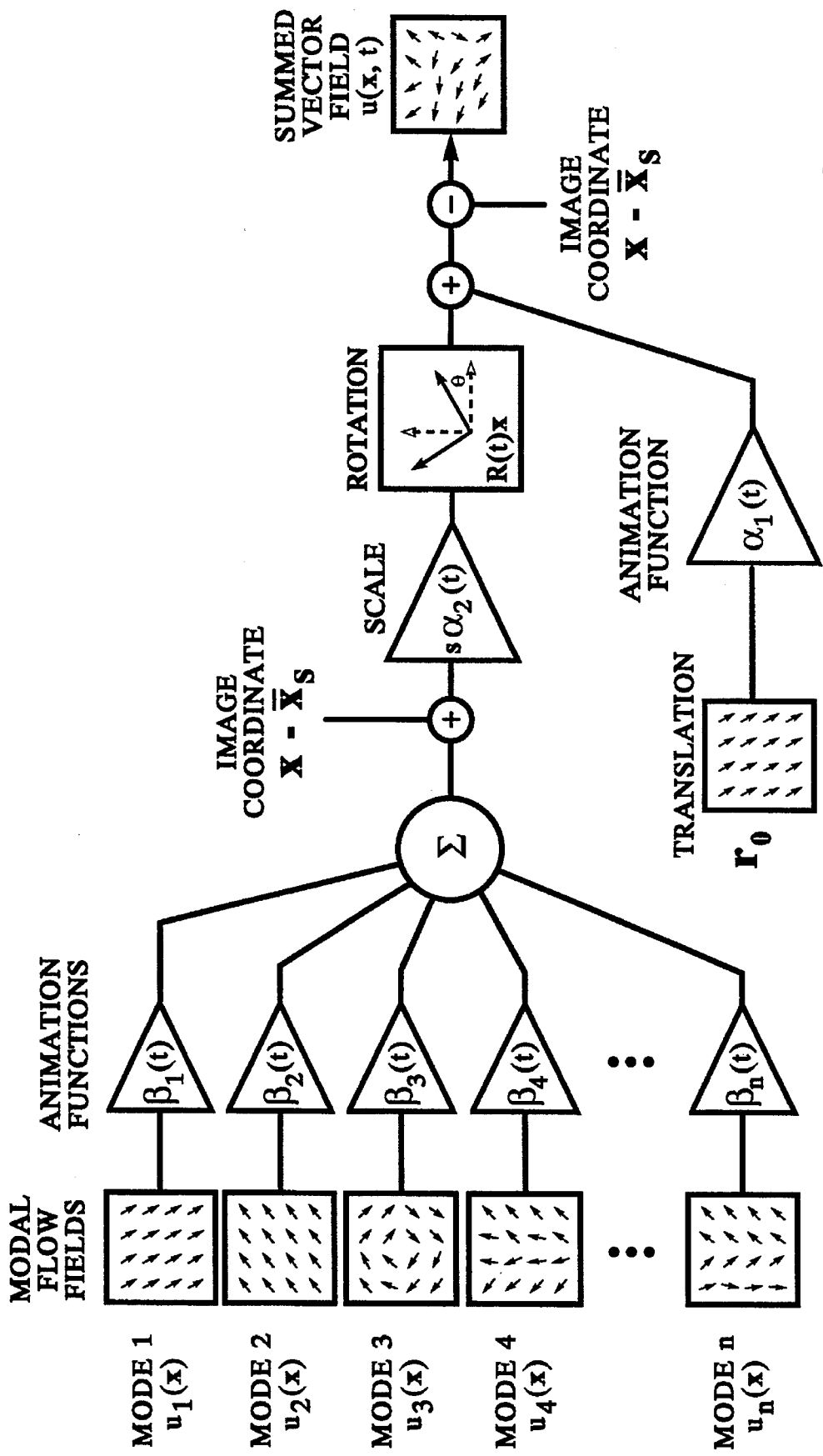
FIG. 7 is a block diagram that depicts an intermediate-image-generation process in which scaling, rigid-body, and deformational transformations are separately applied.

If significant rotation was necessary to align the source and target images, the value $U_{equil}$, as was explained above, is determined in such a way that it does not move the source-image anchor points all the way to their corresponding target locations; instead, it moves them only to intermediate locations from which the non-deformational transformation will result in the corresponding target locations. For the general case, therefore, we perform the morphing in accordance with a process depicted in FIG. 7. This process can be expressed as follows:

$$u(x,t) = \alpha_1(t)x_0 + \alpha_2(t)sR(t)[x - \bar{x}_S + H\Phi\beta \bar{U}_{equil}] - x + \bar{x}_S,$$

where R(t) is a time-dependent rotation matrix generated, in accordance with the method described above, from the following quaternion:

$$\mathring{q}(t) = \frac{\sin\{[1 - \alpha_3(t)]\theta\}}{\sin\theta} \mathring{q}_S + \frac{\sin[\alpha_3(t)\theta]}{\sin\theta} \mathring{q}_T,$$

where $$\mathring{q}_S = 1 + 0i + 0j + 0k,$$

the quaternion representing the rigid-body rotation to the target orientation is $\mathring{q}_T$, and $\theta$ is the spherical angle between the quaternions:

$$\theta = \cos^{-1}(\mathring{p} \cdot \mathring{q}).$$

The anchor-point-determination process described here has a wide range of applications. In the morphing application, for instance, the source and target images are typically, although not necessarily, obtained by digitizing camera-generated natural images, and the output images are generated by any appropriate apparatus for printing or otherwise displaying computer-generated images. The image sources for object recognition and alignment may be cameras, too, but they may also be other image-generating equipment, such as computer-aided-design apparatus.

Of course, the cameras are not necessarily simple two-dimensional still or video cameras. They may instead be stereo cameras for generating three-dimensional data. Particularly for medical applications, moreover, they may not simply be optical cameras but may instead be X-ray, positron-emission, magnetic-resonance, or other types of imaging devices from which two-, three-, or, if time is included, four-dimensional images are generated by computer-implemented methods such as tomography. Other sources, such as well-logging equipment, which produce one-dimensional images, can produce source and/or target images, too.

It is thus apparent that the present invention has a wide range of applications and therefore constitutes a significant advance in the art.

What is claimed is:

1. A method of processing images by determining a point in a target image comprising electronically encoded target points that corresponds to a given point in a source image comprising electronically encoded source points, the method comprising the steps of:

A) defining first and second simulated elastic bodies associated with the source and target images, respectively, each body comprising body points which include nodal points;

B) identifying source and target feature points among the source and target points, respectively;

C) for each of the images, computing the mode shapes of the modes of collective motion of nodal points of the body associated with that image and whose positions with respect to each other are the same as those of the feature points in the associated image, each of said mode shapes being an eigenvector comprising eigenvector components, each eigenvector component being associated with a different nodal point and representing the relative participation of that nodal point in the mode to which the eigenvector corresponds, and thereby associating with each feature point a generalized feature vector whose components represent the participations as embodied in the eigenvector components, of that feature point's associated nodal point in respective modes;

D) assigning to each of a plurality of the source feature points a target feature point associated with a generalized feature vector whose difference from that associated with that source feature point is sufficiently small according to a predetermined criterion;

E) determining a mapping function of source points to target points in accordance with the relationships between the target feature points to which source feature points are assigned and the points to which the mapping function maps those same feature points;

F) identify the point in the target image that corresponds to the given source point by applying the mapping function to the given source point; and G) based on the correspondence, processing at least one of the source and target images or generating at least one intermediate image therebetween.

2. A method as defined in claim 1 wherein the mapping function is non-deformational.

3. A method as defined in claim 1 wherein the mapping function applies to each source point a respective target point whose displacement from that source point is the sum of the products of (A) the displacements from source feature points of intermediate points that result when subjected to scaling and a rigid-body transformation, in the target feature points with which their respective source feature points are associated and (B) respective sums of interpolation functions evaluated at that source point.

4. A method as defined in claim 3 wherein the interpolation functions are Gaussian functions centered on respective source feature points having locations in the source image, the centering being accomplished such that each Gaussian function assumes its maximum value for an argument corresponding to the position of its respective source feature point.

5. A method as defined in claim 1 wherein the step of computing the mode shapes includes employing as the displacement of each body point in each simulated elastic body a value equal to the sum, evaluated at that body point, of the products of the displacements of that simulated elastic body's nodal points and respective interpolation functions, each interpolation function being a sum over the nodal points of Gaussian functions, centered on the respective nodal points such that each of the Gaussian functions assumes its maximum value for an argument value corresponding to the position of its respective nodal point.

6. A method as defined in claim 1 wherein the source and target images are one-dimensional images.

7. A method as defined in claim 1 wherein the source and target images are two-dimensional images.

8. A method as defined in claim 1 wherein the source and target images are three-dimensional images.

9. A method as defined in claim 1 wherein the images are n-dimensional images, where n>3.

10. An apparatus for processing images by determining a point in an electronically encoded target image comprising target points which include target feature points that corresponds to a given point in an electronically encoded source image comprising source points which include source feature points, the apparatus comprising:

A) body-defining circuitry for defining first and second simulated elastic bodies associated with the source and target images, respectively, each body comprising body points which include nodal points;

B) mode-shape-computation circuitry for computing, for each of the images, the mode shapes of the modes of collective motion of nodal points of the body associated with that image and whose positions with respect to each other are the same as those of the feature points in the associated image, each of said mode shapes being an eigenvector comprising eigenvector components, each eigenvector component being associated with a different nodal point and representing the relative participation of that nodal point in the mode to which the eigenvector corresponds, and thereby associating with each feature point a generalized feature vector whose components represent the participations, as embodied in the eigenvector components, of that feature point's associated nodal point in respective modes;

C) correspondence circuitry for assigning to each of a plurality of the source feature points a target feature point associated with a generalized feature vector whose difference from that associated with that source feature point is sufficiently small according to a predetermined criterion;

D) map-determination circuitry for determining a mapping function of source points to target points in accordance with the relationships between the target feature points to which source feature points are assigned and the points to which the mapping function maps those same feature points;

E) point-identifying circuitry for identifying the point in the target image that corresponds to the given source point by applying the mapping function to the given source point and generating an indication of the point thus identified; and F) image-processing circuitry for processing, based on the correspondence, at least one of the source and target images or generating at least one intermediate image therebetween.

11. An apparatus as defined in claim 10 wherein the mapping function is non-deformational.

12. An apparatus as defined in claim 10 wherein the mapping function applies to each source point a respective target point whose displacement from that source point is the sum of the products of (A) the displacements from source feature points of intermediate points that result, when subjected to scaling and a rigid-body transformation, in the target feature points with which their respective source feature points are associated and (B) respective sums of interpolation functions evaluated at that source point.

13. An apparatus as defined in claim 12 wherein the interpolation functions are Gaussian functions centered on respective source feature points having locations in the source image, the centering being accomplished such that each Gaussian function assumes its maximum value for an argument corresponding to the position of its respective source feature point.

14. An apparatus as defined in claim 10 wherein the mode-shape-computation circuitry employs as the displacement of each body point in each simulated elastic body a value equal to the sum, evaluated at that body point of the products of the displacements of that simulated elastic body's nodal points and respective interpolation functions, each interpolation function being a sum over the nodal points of Gaussian functions, centered on the respective nodal points such that each of the Gaussian functions assumes its maximum value for an argument value corresponding to the position of its respective nodal point.

15. An apparatus as defined in claim 10 wherein the source and target images are one-dimensional images.

16. An apparatus as defined in claim 10 wherein the source and target images are two-dimensional images.

17. An apparatus as defined in claim 10 wherein the source and target images are three-dimensional images.

18. An apparatus as defined in claim 10 wherein the images are n-dimensional images, where n>3.

* * * * *